United States Patent
Kim et al.

(10) Patent No.: US 6,637,706 B2
(45) Date of Patent: Oct. 28, 2003

(54) FUEL TANK CRADLE DEVICE FOR FORKLIFT TRUCKS

(75) Inventors: Kyung Ho Kim, Incheon (KR); Sang Heon Lee, Incheon (KR); Hong Sub Shim, Seoul (KR); Jin Hong Park, Seoul (KR)

(73) Assignee: Daewoo Heavy Industries & Machinery Ltd., Incheon (KR)

( * ) Notice: Subject to any disclaimer, the term of this patent is extended or adjusted under 35 U.S.C. 154(b) by 0 days.

(21) Appl. No.: 10/162,233

(22) Filed: Jun. 5, 2002

(65) Prior Publication Data

US 2003/0001059 A1 Jan. 2, 2003

(30) Foreign Application Priority Data

| Jun. 5, 2001 | (KR) | 2001-31349 |
| Sep. 7, 2001 | (KR) | 2001-55169 |
| May 31, 2002 | (KR) | 2002-30742 |

(51) Int. Cl.⁷ .............................. A47G 23/02; B60P 3/22
(52) U.S. Cl. .................. 248/154; 248/313; 248/346.01; 280/830; 280/834
(58) Field of Search ............................ 248/346.01, 317, 248/313, 154; 280/834, 836, 831, 832; 180/271

(56) References Cited

U.S. PATENT DOCUMENTS

| 2,895,560 A | * | 7/1959 | Lynn | 180/69.5 |
| 3,792,814 A | * | 2/1974 | Platz | 239/149 |
| 4,025,080 A | * | 5/1977 | Gedeon | 280/834 |
| 4,059,281 A | * | 11/1977 | Evans | 280/834 |
| 4,162,796 A | * | 7/1979 | Mead | 280/830 |
| 4,770,428 A | * | 9/1988 | Sugiyama | 280/834 |
| 4,846,499 A | * | 7/1989 | Izumi et al. | 280/830 |
| 5,054,740 A | * | 10/1991 | Wheeler | 248/675 |
| 5,330,031 A | * | 7/1994 | Hill et al. | 180/271 |
| 5,405,234 A | * | 4/1995 | Ziaylek et al. | 414/462 |
| 5,634,665 A | * | 6/1997 | Jung | 280/834 |
| 5,806,892 A | * | 9/1998 | Colburn | 280/834 |
| 5,845,940 A | * | 12/1998 | Colburn | 280/830 |
| 6,042,071 A | * | 3/2000 | Watanabe et al. | 248/313 |
| 6,138,770 A | * | 10/2000 | Kayser | 172/677 |

FOREIGN PATENT DOCUMENTS

| JP | 358101827 A | * | 6/1983 | B60K/15/08 |

* cited by examiner

Primary Examiner—Leslie A. Braun
Assistant Examiner—Amy J. Sterling
(74) Attorney, Agent, or Firm—Staas & Halsey LLP

(57) ABSTRACT

A fuel tank cradle device for forklift trucks is swingable to the lateral side and then foldable into a substantially vertical position, thereby assuring easy and safe change of a used fuel tank with a new one. The cradle device includes a counterweight, a cradle provided with a first body and a second body, the first body pivotally mounted to the counterweight for rotation between a home position above the counterweight and a rotated position outside of the counterweight, the second body capable of replaceably supporting a fuel tank and foldably connected to the first body so that the second body can be moved between an unfolded position and a downwardly folded position with respect to first body, and a locking arrangement for locking the cradle to the counterweight while the first body of the cradle is at the home position.

14 Claims, 14 Drawing Sheets

FUEL TANK CRADLE DEVICE FOR FORKLIFT TRUCKS

BACKGROUND OF THE INVENTION

1. Field of the Invention

The present invention is generally directed to liquid propane powered forklift trucks and, more specifically, to a fuel tank cradle device for forklift trucks, which enables a fuel tank to be lowered to as near the ground as possible, thereby assuring easy and safe change of the fuel tank.

2. Description of the Prior Art

As is generally known in the art, conventional forklift trucks include a vehicle frame, a mast attached to the front end of the vehicle frame, a fork carriage adapted for elevational movement along the mast to raise and lower loads and a counterweight located at the rear end of the vehicle frame for retaining balance of the forklift truck as heavyweight loads are lifted up and lowered down. Mounted substantially at the center of the vehicle frame is an engine which will be kept covered with a hood or bonnet. A driver's seat is fixedly secured to the hood and surrounded by an overhead guard which defines a cabin of the trucks. In case of a liquid propane powered forklift truck, it would be necessary to replaceably mount a fuel tank, e.g., liquid propane tank, over the counterweight in a manner that the fuel tank lies on its side and is tied up with a bander or clamp. At the time when the fuel tank runs dry, the bander is untied to permit replacement of the fuel tank with a full one.

There occur frequently such instances where the hood is opened for the operator to gain access to an engine room provided under the hood. The fuel tank held above the counterweight will at this time hinder the backward swing of the seat and thus heavily restrict the opening angle of the hood. In other words, the hood cannot be fully opened without removing the fuel tank prior to the backward opening of the hood. To assure that the hood be opened to its full opening angle, therefore, it is required to remove the fuel tank beforehand into a position wherein no physical interference may take place between the seat and the fuel tank.

As a solution to this problem, use has been made of a fold-back type fuel tank mount that enables a fuel tank to be moved rearwardly from its home position in advance of a hood being opened. The fold-back type fuel tank mount includes a base plate attached to a counterweight of the forklift truck, a swingable cradle lying above the base plate and having a bander with which the fuel tank may be tied up, a hinge for coupling the swingable cradle to the base plate and a latch adapted to retain the swingable cradle against any unwanted swinging movement with respect to the base plate.

In operation, pulling backward the fuel tank with the latch released will cause the swingable cradle to turn rearwardly about a horizontal hinge axis so that the fuel tank is removed out of the home position to permit full opening of the hood.

Due mainly to the heavyweight nature of the fuel tank, the fold-back type fuel tank mount stated above tends to pose a drawback in that, in the process of swinging the cradle together with the fuel tank, a significant magnitude of mechanical shock may occur with the result that parts or components are subjected to deformation and even breakage. An attempt has been made to avoid such drawback in U.S. Pat. No. 5,634,665, which discloses a sliding type fuel tank mount including a fixed plate attached to the counterweight of a forklift truck and a movable plate supporting the fuel tank thereon and adapted for backward sliding movement with respect to the fixed plate to leave a room for accommodation of a seat-carrying hood when the latter is to be opened.

With the prior art fuel tank mounts as referred to hereinabove, as the fuel tank runs dry, it is usually the responsibility of the operator to replace the empty tank with a full one. This requires six steps: (i) Disconnect a feed hose leading from the tank to an engine; (ii) Unclamp the empty tank from its cradle; (iii) Lift and remove the empty tank; (iv) Lift a new tank and place it is the cradle; (v) Clamp the new tank in place; and (vi) Connect the feed hose to the new tank.

The tank replacing procedure entails a difficult and potentially dangerous task. The main difficulty with this procedure lies in steps (iii) and (iv) wherein the operator must lift the fuel tank from the ground to a height of 120 cm or more. Empty liquid propane tanks normally weight between 8.5 and 22 kg, full tanks weighing about 17.5 to 41 kg. With the fuel tank held at chest level or higher, the operator has to extend the tank over the counterweight to drop it into the cradle, in which process the risk of injury to the operator is significant. Some operators consider heaving the tank onto the truck to be a "macho" part of the job. But with more women drivers being hired and the tightening of union rules and government safety regulations, there is a need for an improved fuel tank mount that eases the task of loading and unloading fuel tanks.

In consideration of such a problem, U.S. Pat. No. 5,806,892 discloses a fuel tank mount for forklift trucks with a swing arm swingable about a tilted pivot axis, which enables a fuel tank to be replaced with ease. The fuel tank mount includes a swing arm replaceable carrying the fuel tank, which is pivotally mounted to a tilted pivot pin for rotation between a home position wherein the tank is held above and laterally across the counterweight and a tank changing position wherein the tank lies alongside the counterweight. In the fuel tank mount of the construction referred to just above, the fuel tank is replaced with a new one in a state where the swing arm is located at the tank changing position, and the swing arm is rotated to its original position, the home position, so that the new fuel tank can be held above the counterweight. In this way, the fuel tank mount enables a fuel tank to be more easily replaced.

SUMMARY OF THE INVENTION

It is an object of the present invention to provide a fuel tank cradle device for forklift trucks which enables a fuel tank to be lowered to as near the ground as possible in a substantially vertical posture, thereby assuring easy and safe change of the fuel tank.

With this object in view, there is provided a fuel tank cradle device for forklift trucks, comprising: a counterweight; a cradle including a first body and a second body, the first body pivotally mounted to the counterweight for rotation between a home position above the counterweight and a rotated position outside of the counterweight, the second body capable of replaceably supporting a fuel tank and foldably connected to the first body so that the second body can be moved between an unfolded position and a downwardly folded position; and a locking means for locking the cradle to the counterweight while the first body of the cradle is at the home position.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Fuel tank cradle devices for forklift trucks according to preferred embodiments of the invention will now be described with reference to the accompanying drawings.

Figure 1:
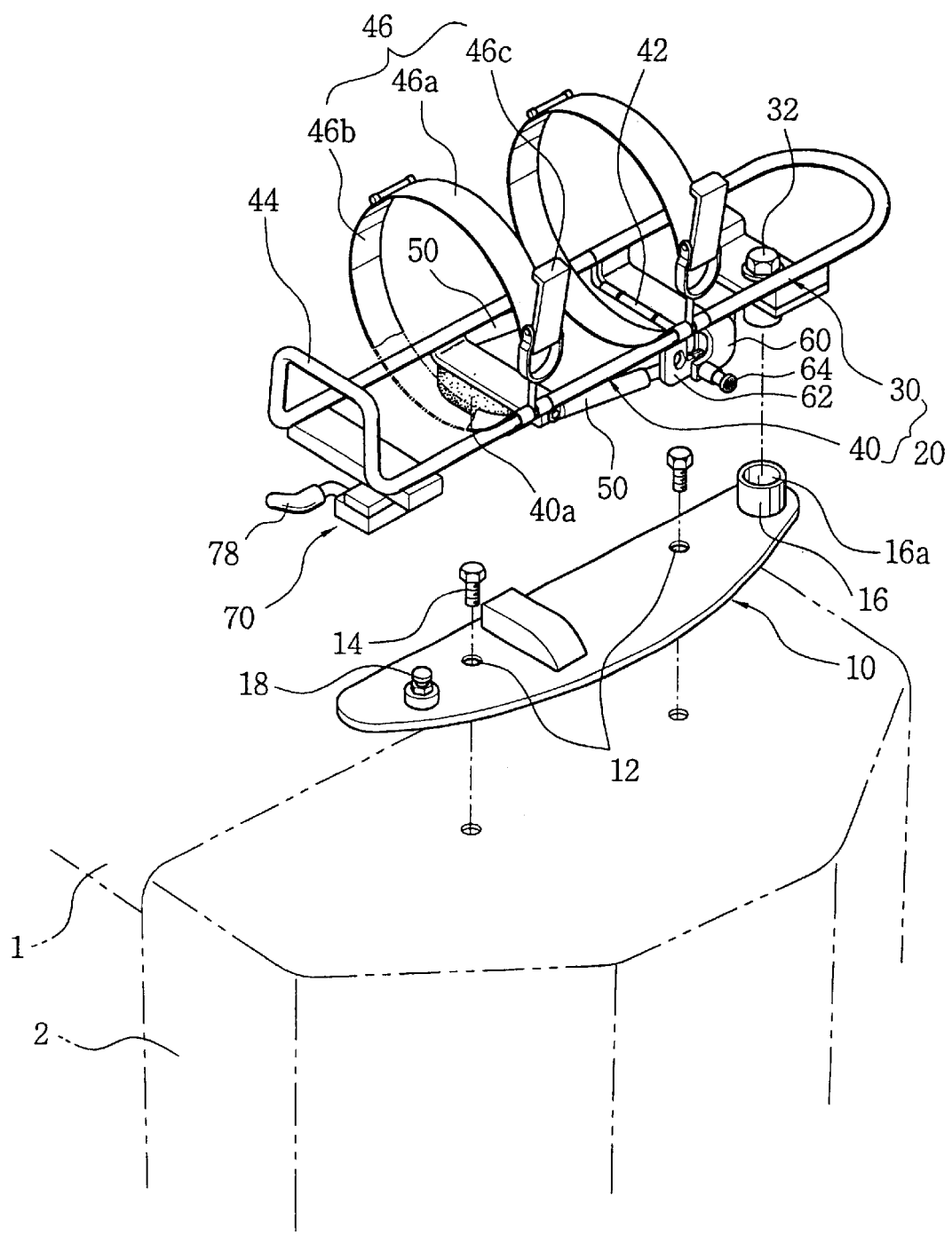
FIG. 1 is an exploded perspective view of a fuel tank cradle device for forklift trucks according to an embodiment of the present invention.
Figure 2:
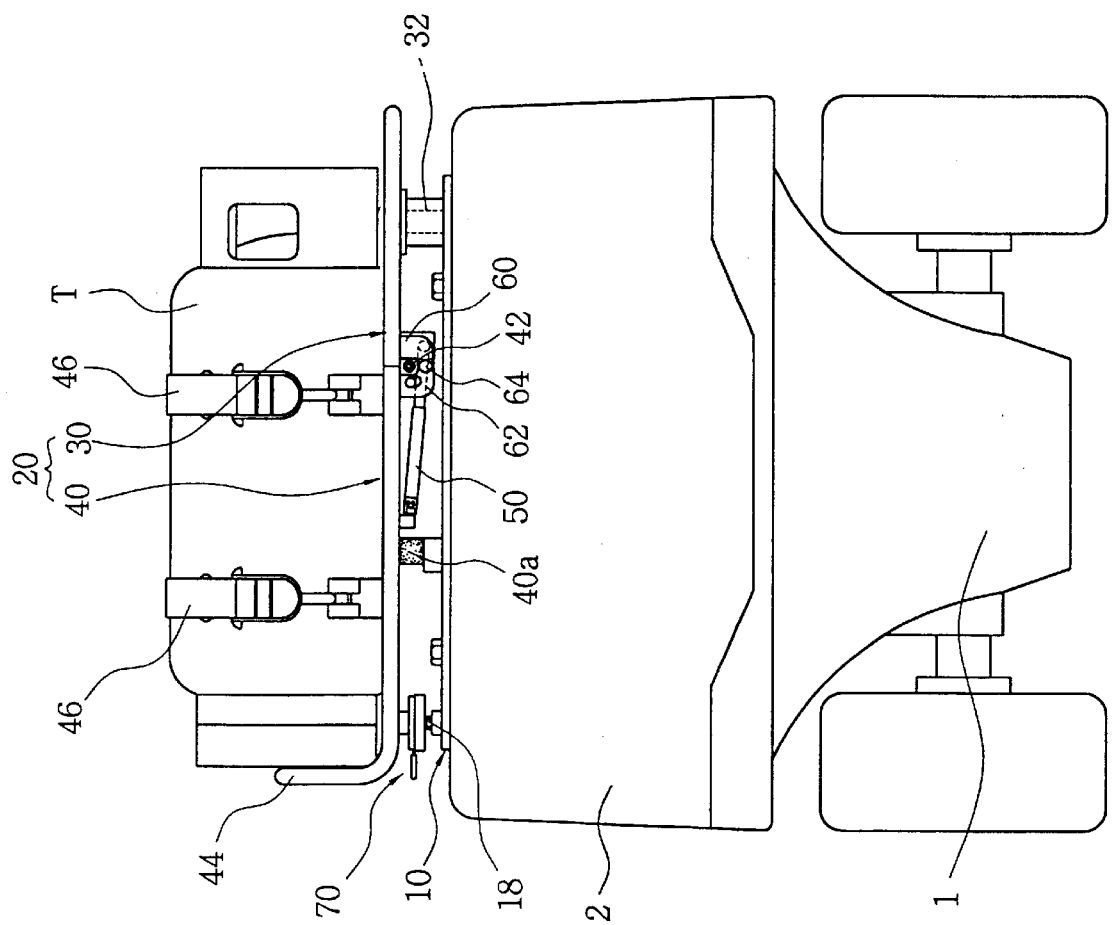
FIG. 2 is a rear view of a forklift truck provided with the fuel tank cradle device shown in FIG. 1.

Referring first to FIGS. 1 and 2, a fuel tank cradle device according to an embodiment of the present invention includes a counterweight 2, disposed behind a vehicle frame 1, a base plate 10 fixed to the top surface of the counterweight 2, and a cradle 20 swingably assembled with the base plate 10.

The base plate 10 has a plurality of assembling slots 12, in which assembling bolts 14 are fitted. The assembling bolts 14 are driven through the assembling slots 12 into the counterweight 2, so that the base plate 10 is fixedly assembled with the counterweight 2 of the forklift truck. Further, the base plate 10 has a bearing tube 16 protruding upwards from one lateral portion of the base plate 10, which has a hinge hole 16a formed through the bearing tube 16.

The cradle 20 is adapted to support a fuel tank T while the fuel tank is laid on its side on the cradle 20. The cradle 20 includes a first body 30 and a second body 40 pivotally assembled with the first body 30. A hinge bolt 32 assembled with the first body 30 is rotatably fitted in the hinge hole 16a of the bearing tube 16. In this way, the first body 30 assembled with the base plate 10 through the hinge bolt 32 is swingable about the hinge bolt 32. As a result, the cradle 20 is freely swingable with respect to the base plate 10, that is to say, the cradle 20 may swing between a home position. A above the counterweight 2 and a rotated position B outside of the counterweight 2.

The second body 40 and the first body 30 serves to support the fuel tank T through direct contact with the fuel tank T, as shown in FIG. 2. The second body 40 is assembled with the first body 30 by a hinge 42, so that the second body 40 can be pivotally moved about the hinge 42 between an unfolded position C where the second body 40 is in line with the first body 30 and a downwardly folded position D where the second body 40 makes a right angle with respect to the first body 30, as shown in FIG. 3B. When the second body 40 hingedly assembled with the first body 30 is swung to the outside of the counterweight 2 and then pivotally moved about the hinge 42 into the downwardly folded position D, the fuel tank T can be vertically loaded on the second body 40. The second body 40 has a supporting portion 44 bent and extending at an angle from an end of the second body 40 to support the bottom of the vertically standing fuel tank T in the state where the second body 40 is located at the downwardly folded position D. Further, the second body 40 includes a pair of clamp assemblies 46 replaceably fastening the fuel tank T. As shown in FIG. 1, each clamp assembly 46 includes an upper clamp 46a having a semicircular shape, a lower clamp 46b also having a semicircular configuration and hingedly assembled with the upper clamp 46a, and a clamp latch 46c fixing the free ends of the upper clamp 46a and the lower clamp 46b to each other.

Furthermore, the fuel tank cradle device includes a damping means for controlling the folding speed of the second body 40 with respect to the first body 30, as shown in FIG. 2. A gas-filled damper 50 is provided which has one end rotatably fixed to the lower surface of the first body 30 and the other end rotatably fixed to the lower surface of the second body 40. The damper 40 functions to elastically urge the second body 40 toward the unfolded position C where the first body 30 and the second body 40 are in straight line with each other, so as to prevent the second body 40, which supports the heavy fuel tank T, from rapidly moving with respect to the first body 30 and then colliding to the counterweight 2 with great shock. In addition to the damper 50, the second body 40 has cushioning rubber 40a attached to the lower surface of the second body 40, which prevents the second body 40 from directly colliding with the counterweight 2. Meanwhile, a pair of dampers 50 are disposed at both sides under the cradle 20 so as to improve the damping efficiency.

Figure 3A:
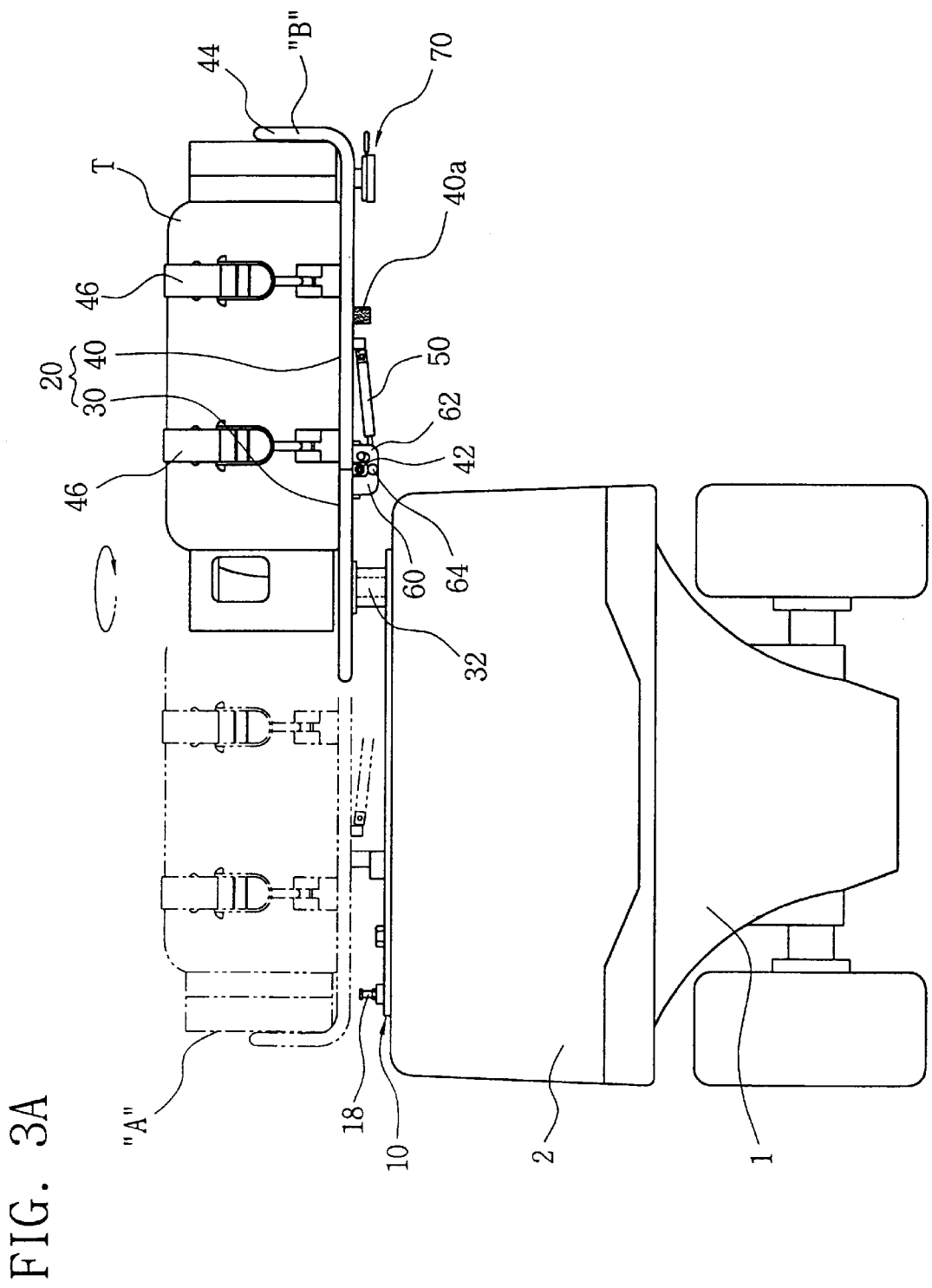
FIGS. 3A and 3B are rear views of the forklift truck shown in FIG. 2, which illustrate the swinging and folding operation of the cradle device.
Figure 3B:
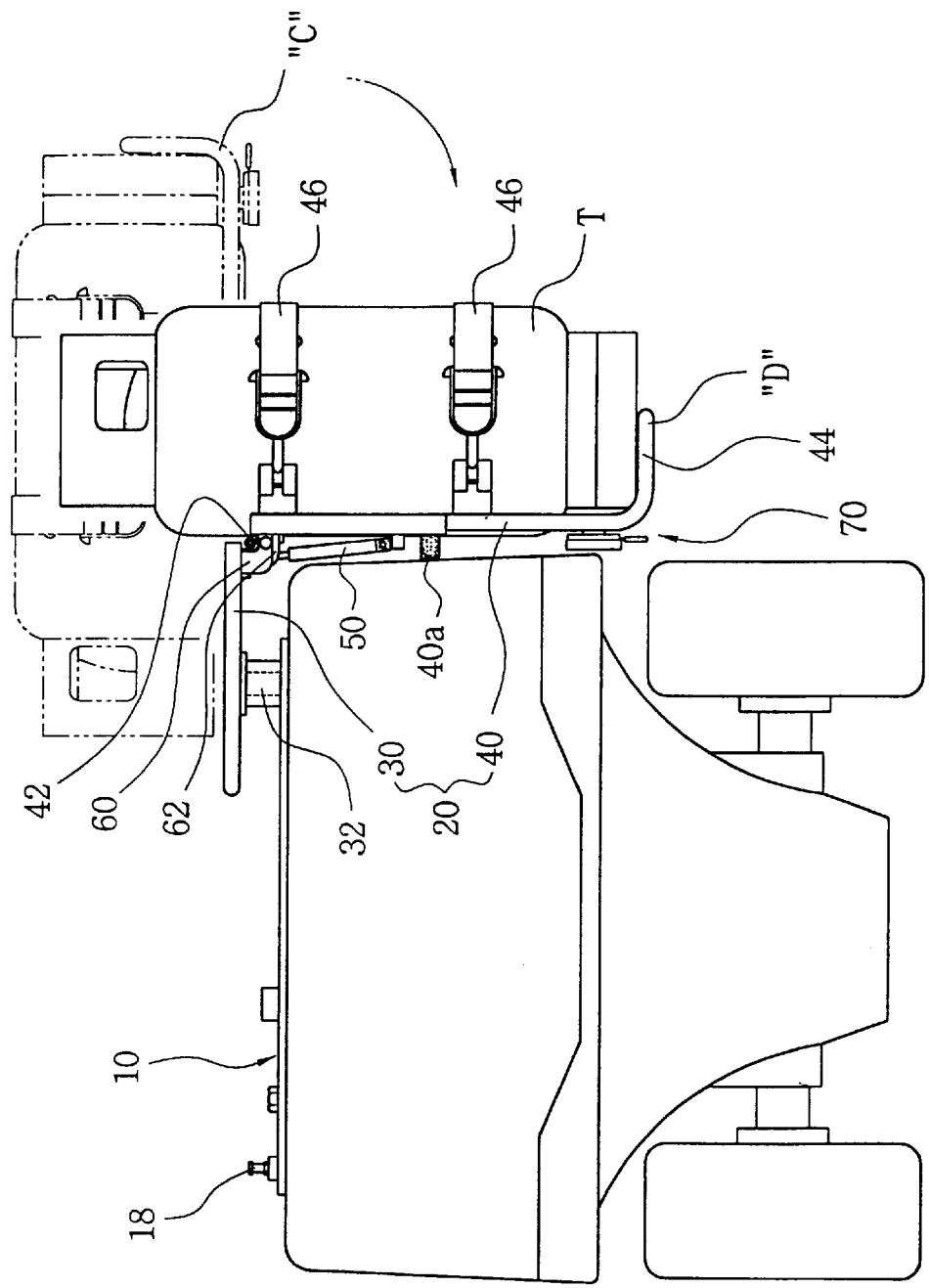

As shown in FIGS. 3A and 3B, the cradle 20 having the above construction is located at the position B after it has been rotated 180° about the hinge bolt 32 with respect to the base plate 10. And then the second body 40 may be rotated 90° about the hinge 42 into the downwardly folded position D, thereby locating the fuel tank T in an upstanding position so that the fuel tank T can be easily replaced. After the fuel tank T is replaced with a new one, the second body 40 is rotated 90° upwards about the hinge 42 back to the unfolded position C, and then the cradle 20 is rotated back 180° about the hinge bolt 32 so that the new fuel tank T is located again at the home position A above the counterweight 2.

Figure 4:
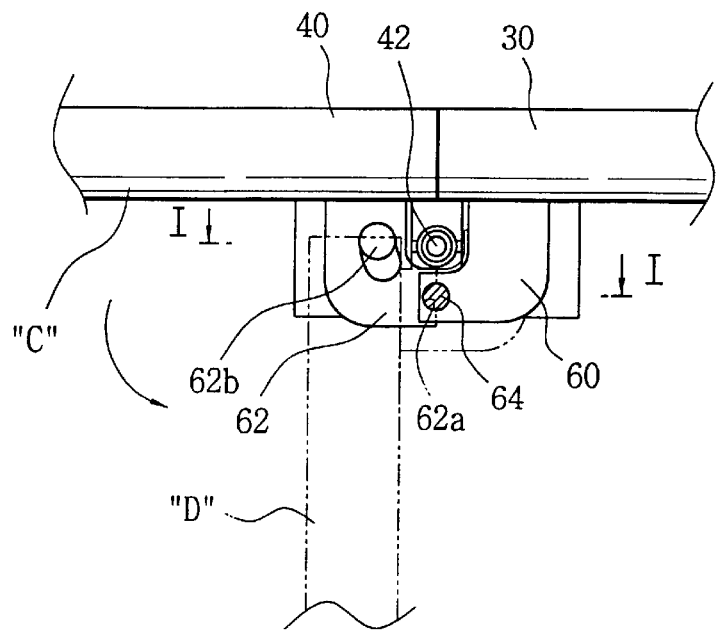
FIG. 4 is a partially enlarged side view showing a retaining means for keeping a second body of the cradle at the unfolded position or the downwardly folded position.
Figure 5:
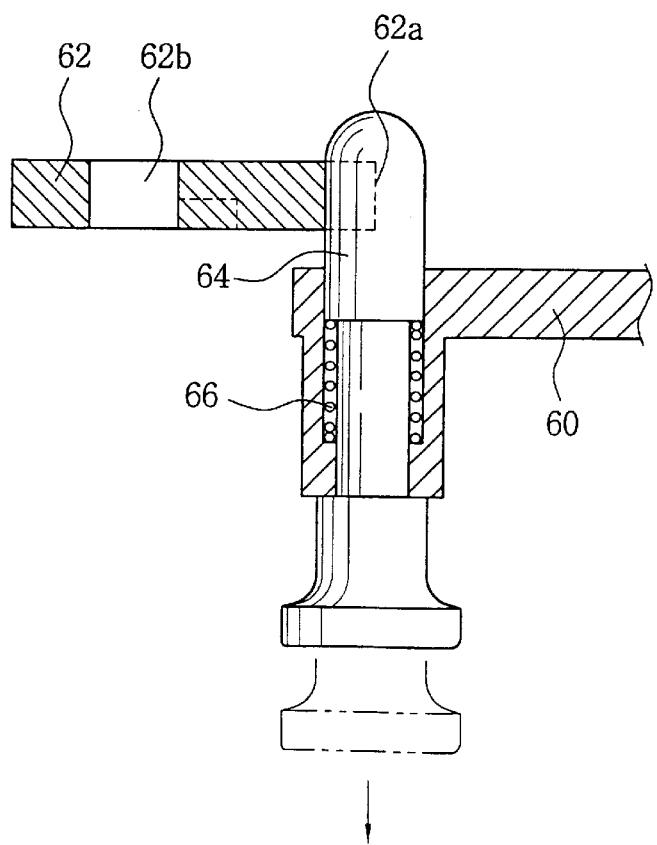
FIG. 5 is a sectional view taken along line I—I in FIG. 4.

Referring to FIGS. 4 and 5, the fuel tank cradle device according to the present invention includes a retaining means for keeping the second body 40 at the unfolded position C or the downwardly folded position D. The retaining means includes a first retainer bracket 60, a second retainer bracket 62, a retainer pin 64, first and second retainer portions 62a and 62b, and a retainer spring 66. The first retainer bracket 60 is integrally formed with the first body 30 of the cradle 20 and the second retainer bracket 62 is integrally formed with the second body 40 of the cradle 20, in such a manner that the first retainer bracket 60 and the second retainer bracket 62 overlap with and are opposed to each other. The retainer pin 64 is movably assembled with the first retainer bracket 60 of the first body 30. The first and second retainer portions 62a and 62b are formed at the second retainer bracket 62 of the second body 40, and the retainer pin 64 of the first retainer bracket 60 is aligned with the first and second retainer portions 62a and 62b of the second retainer bracket 62 when the second body 40 is located at one of the unfolded position C and the downwardly folded position D. The retainer spring 66 is adapted to resiliently bias the retainer pin 64 in such a direction that allows the retainer pin 64 to be engaged with the first and second retainer portions 62a and 62b. In this case, the first retainer portion 62a, which is aligned with the retainer pin 64 when the second body 40 is located at the unfolded position C, is a retainer groove 62a, and the second retainer portion 62b, which is aligned with the retainer pin 64 when the second body 40 is located at the downwardly folded position D, is a retainer hole 62b.

The retaining means having the construction described above is capable of keeping the second body 40 at the unfolded position C or the downwardly folded position D by means of the first and second retainer portions 62a and 62b and the retainer pin 64 engaged therewith. Especially, the retaining means can be released only manually in the state that the second body 40 is retained at the unfolded position C or the downwardly folded position D, thereby preventing the second body 40 from unpredictably rotating from the unfolded position C into the downwardly folded position D and vice versa.

Referring again to FIG. 1, the fuel tank cradle device according to the present invention includes a locking means for locking the cradle 20 at the home position on the base plate 10. The locking means includes a cradle latch 70 provided at the second body 40, and a locking pin 18 formed at the base plate 10 to be locked in the cradle latch 70.

Figure 6:
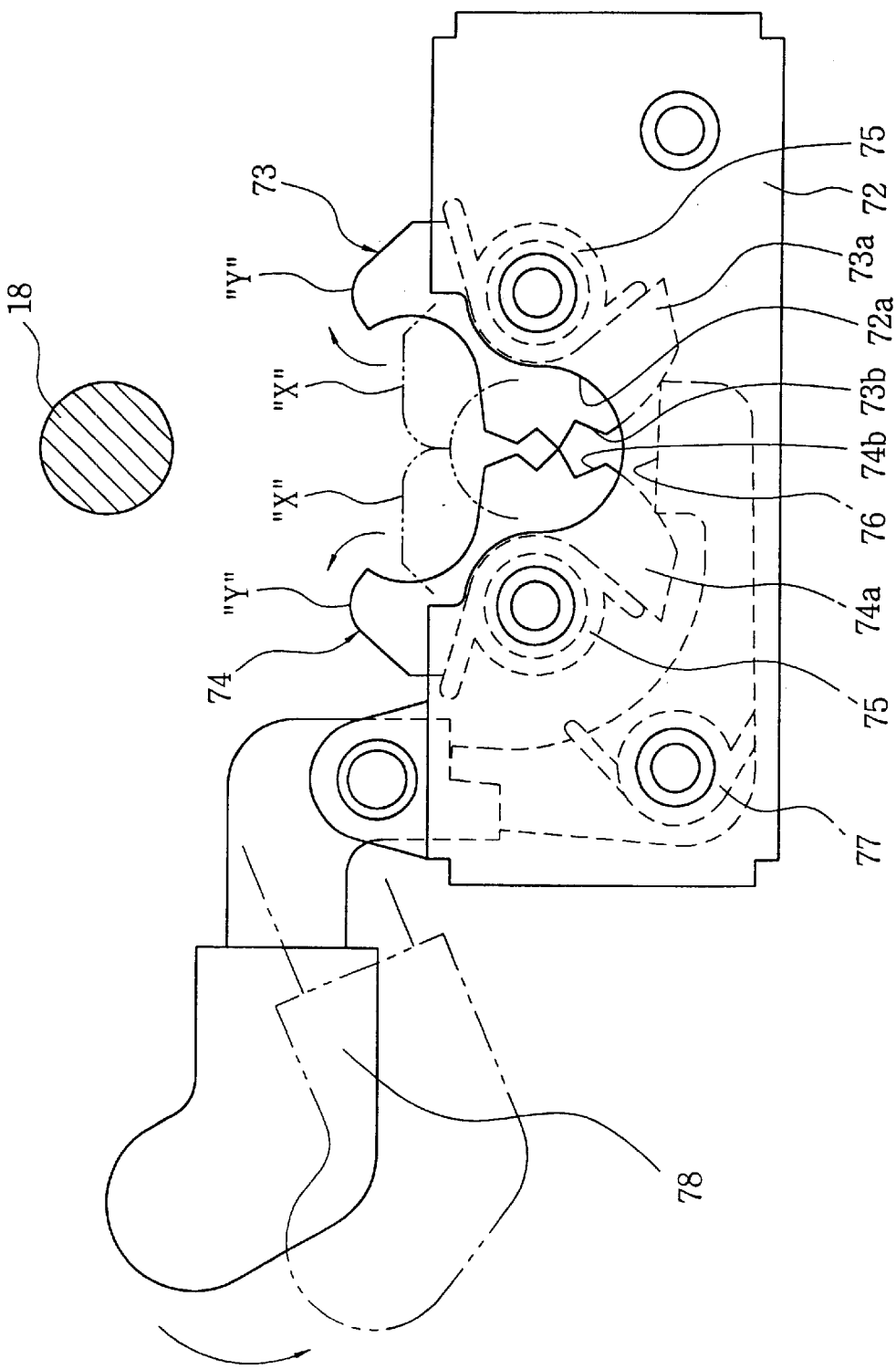
FIG. 6 is a plan view showing the construction of the locking means for locking the cradle at the home position on a counterweight.

As shown in FIG. 6, the cradle latch 70 includes a cover 72 fixed to the second body 40 and a receiving groove 72a in which the locking pin 18 is received. The cradle latch 70 includes first and second locks 73 and 74 which pivot between a locking position X and a release position Y to open or close the receiving groove 72a. The first and the second locks 73 and 74 are rotatably assembled on the cover 72 in an opposed relationship with each other. The first and the second locks 73 and 74 can move symmetrically to one another to open or close the receiving groove 72a of the cover 72. The first and second locks 73 and 74 respectively have first and second lock extensions 73a and 74a extending inwards, and first and second engagement grooves 73b and 74b are respectively formed at the first and the second lock extensions 73a and 74a in an opposed relationship with each other.

The cradle latch 70 includes lock torsion springs 75 for urging the first and the second locks 73 and 74 in the direction that makes the first and the second locks 73 and 74 more away from each other. Each of the lock torsion springs 75 has one end supported by the cover 72 and the other end supported by the first lock extension 73a of the first lock 73 or the second lock extension 74a of the second lock 74, so that the lock torsion springs 75 can urge the first and the second locks 73 and 74 in the direction which makes the first and the second locks 73 and 74 move away from each other, thereby bringing the first and the second locks 73 and 74 into the release position X. The lock torsion springs 75 are adapted to urge the first and the second locks 73 and 74 to open the receiving groove 72a of the cover 72 by locating the first and the second locks 73 and 74 at the release position X in this way.

The cradle latch 70 further includes a pawl plate 76 disposed between the first lock extension 73a of the first lock 73 and the second lock extension 74a of the second lock 74 and rotatably in the cover 72. The pawl plate 76 is disposed in such a manner that both upper edges of the pawl plate 76 can be engaged with the first engagement groove 73b of the first lock extension 73a and the second engagement groove 74b of the second lock extension 74a when the first and the second locks 73 and 74 are located at the locking position X, thereby holding the first and the second locks 73 and 74 at the locking position X. In this case, the pawl plate 76 is resiliently biased toward the gap between the first lock extension 73a of the first lock 73 and the second lock extension 74a of the second lock 74 by a plate torsion spring 77, so that the pawl plate 76 is engaged with and held between the first and the second lock extensions 73a and 74a. The cradle latch 70 includes an operation lever 78 by which the pawl plate 76 can be released from the first and the second lock extensions 73a and 74a. The operation lever 78 is rotatably provided at the cover 72 so that the pawl plate 76 can press the pawl plate 76, and the operation lever 78 extends outward of the cover 72 to facilitate the operation of the operation lever 78 by a user. When the operation lever 78 is actuated to press the pawl plate 76, the end of the pawl plate 76 is released from the engagement with the first and the second lock extensions 73a and 74a, so that the first and the second locks 73 and 74 can be rotated from the locking position X to the release position Y. As a result, the receiving groove 72a of the cover 72 is opened.

According to the above construction, as the cradle 20 is rotated onto the counterweight 2 at the end of fuel tank changing operation, the locking pin 18 of the base plate 10 is received in the receiving groove 72a of the cradle latch 70 provided at the cradle 20. In this case, the received locking pin 18 comes into the receiving groove 72a while forcing the first and second locks 73 and 74, which are held open at the release position Y, so that the forced first and second locks 73 and 74 come closer to each other while rotating from the release position Y toward the locking position X. When the first and the second locks 73 and 74 reach the locking position X after continuously rotating and coming closer to each other, the first and the second locks 73 and 74 are locked by the pawl plate 76. In this state, the receiving groove 72a of the cover 72 is closed, and the locking pin 18 of the base plate 10 is locked in the cradle latch 70. As a result, the cradle 20 can be held at the home position A while being locked on the base plate 10.

As the operation lever 78 is pulled in order to rotate the cradle 20 fixed at the home position A, the pawl plate 76 is pressed by the operation lever 78. In this case, the pressed pawl plate 76 rotates and is separated from the first engagement groove 73b of the first lock 73 and the second engagement groove 74b of the second lock 74, so that the first and the second locks 73 and 74 elastically rotate from the locking position X to the release position Y. As a result, the receiving groove 72a of the cover 72 is opened, and the locking pin 18 of the base plate 10 is unlocked from the cradle latch 70. Therefore, the cradle 20 can be rotated with respect to the base plate 10.

In the fuel tank cradle device according to the present invention as described above, the cradle 20 can be rotated outside of the counterweight 2 and then folded downwards so as to locate the fuel tank T at an optimal position for replacement with a new one. Therefore, the fuel tank cradle device according to the present invention not only enables the fuel tank T to be conveniently replaced with small force, but also can remarkably reduce the difficulty and danger in lifting the heavy fuel tank.

FIGS. 7 to 10B show a fuel tank cradle device for forklift trucks according to another embodiment of the present invention, the construction of which will be described hereinbelow. Since the construction of the fuel tank cradle device according to the present embodiment is similar to that according to the previous embodiment, only the different elements will be described in detail.

Figure 7:
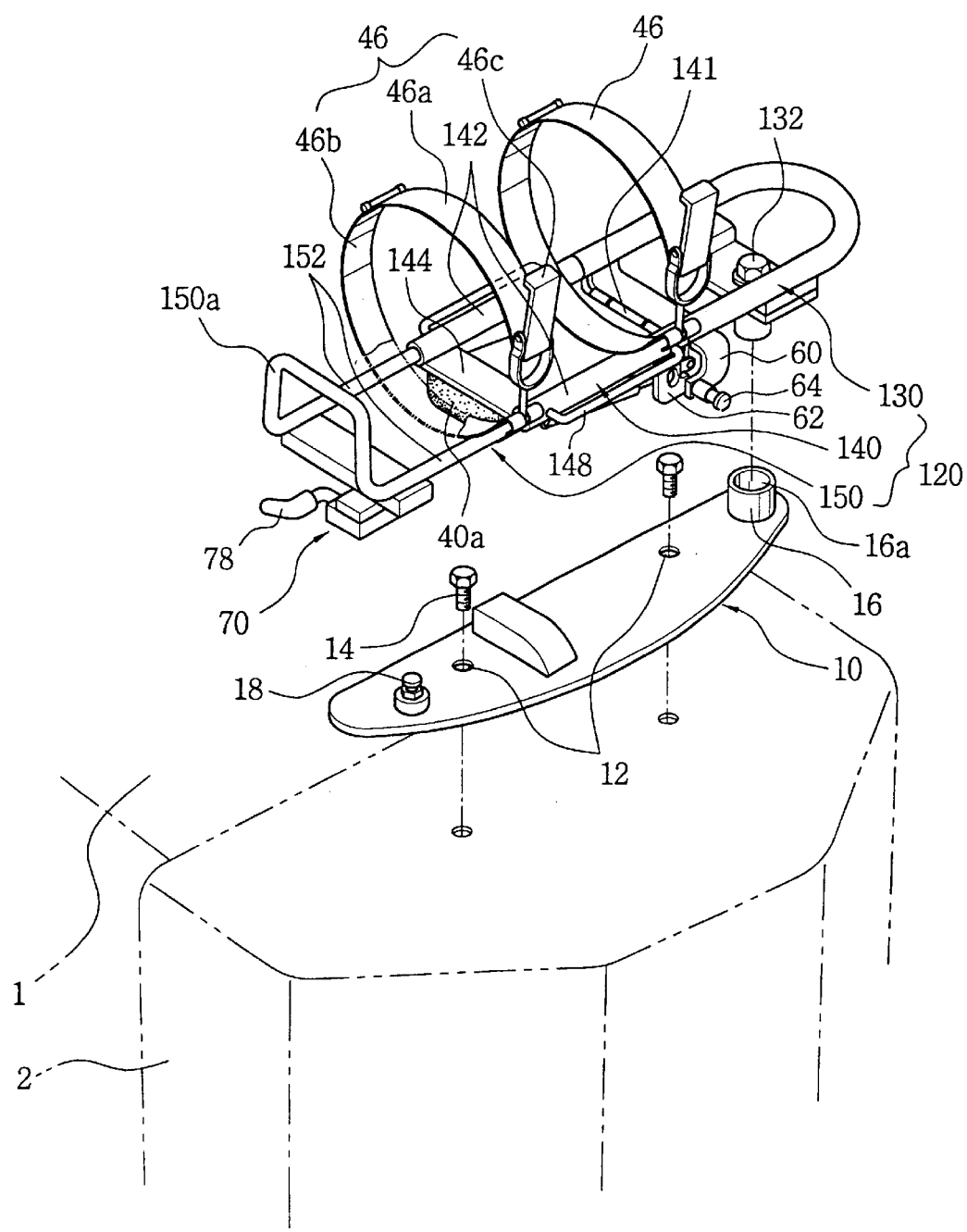
FIG. 7 is exploded perspective view of a fuel tank cradle device for forklift trucks according to another embodiment of the present invention.
Figure 8:
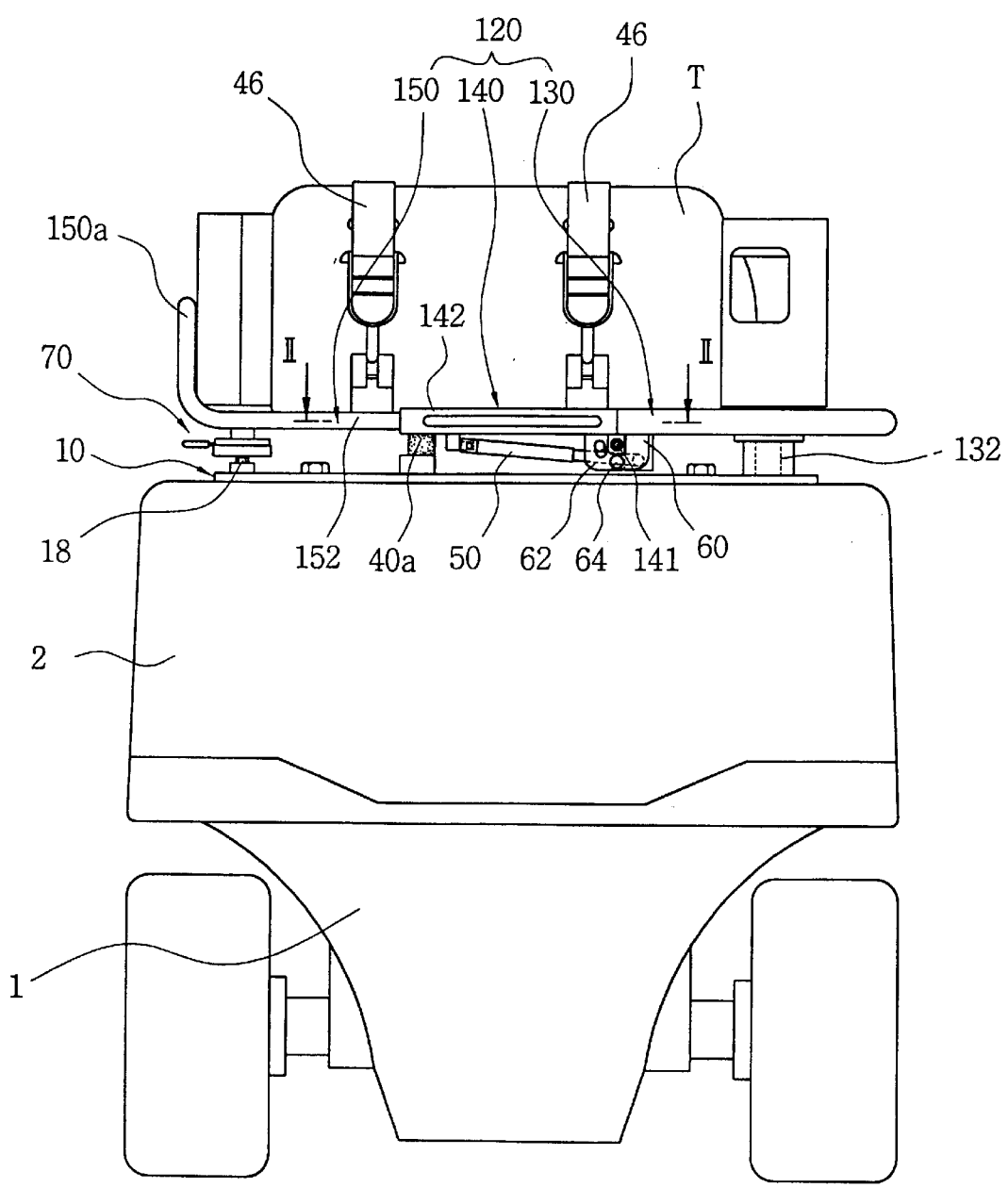
FIG. 8 is a rear view of a forklift truck provided with the fuel tank cradle device shown in FIG. 7.

In the fuel tank cradle device according to the present embodiment, as shown in FIGS. 7 and 8, the cradle 120 includes a first body 130, a second body 140 foldably connected to the first body 130, and a third body 150 extendably assembled with the second body 140 so that the third body 150 can be extended out from the second body 140. As stated, earlier, the first body 130 is swingably assemble with the base plate 10 by means of a hinge bolt 132, and the second body 140 can be pivoted about a hinge 141 between the unfolded position C and the downwardly folded position D. In this case, the second body 140 includes two tubular members 142 extending parallel to each other, and brackets 144 for connecting the tubular members 142 with each other.

Figure 9A:
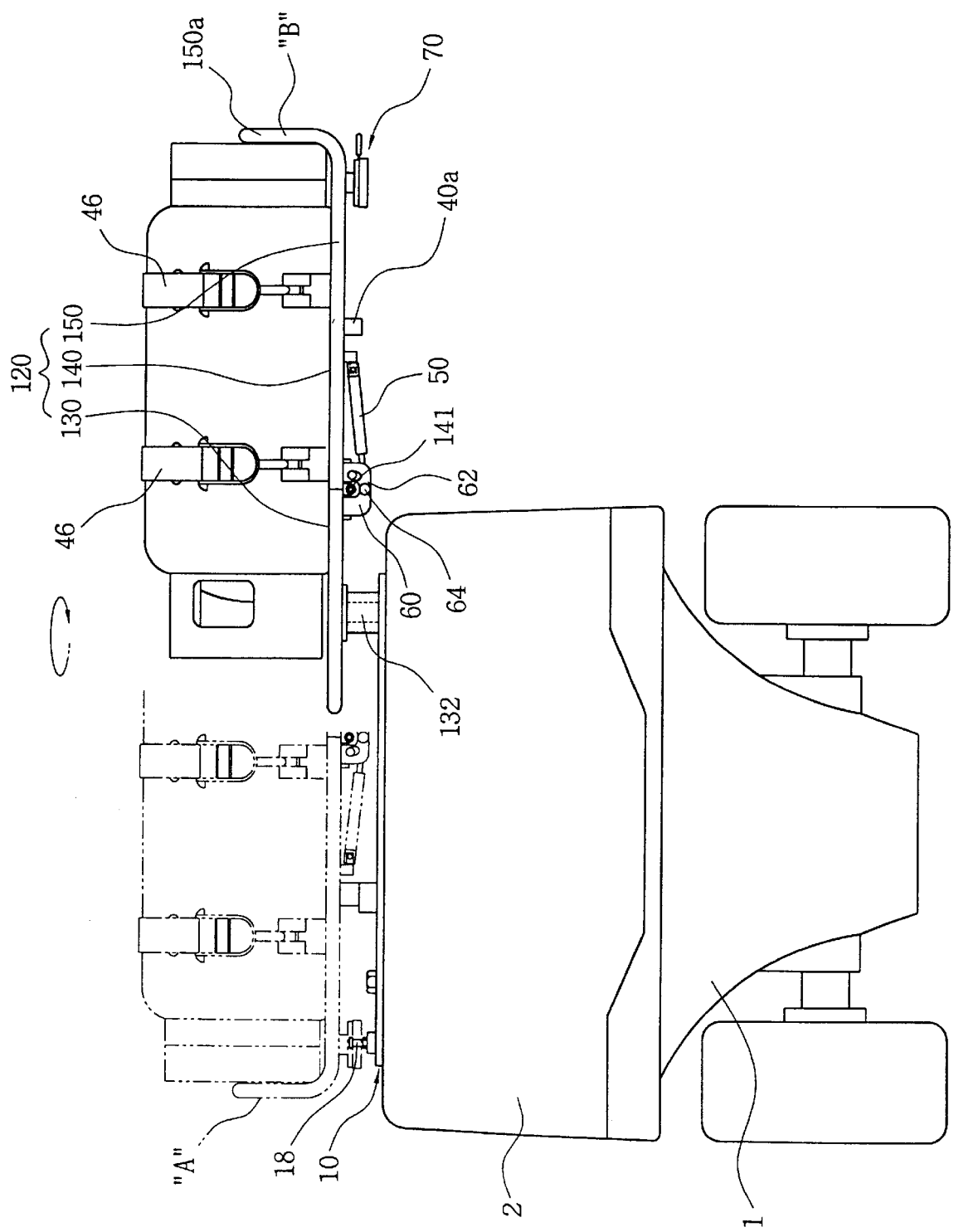
FIGS. 9A to 9C are rear views of the forklift truck shown in FIG. 2, which illustrate the swinging, folding and extending operation of the cradle device.
Figure 9B:
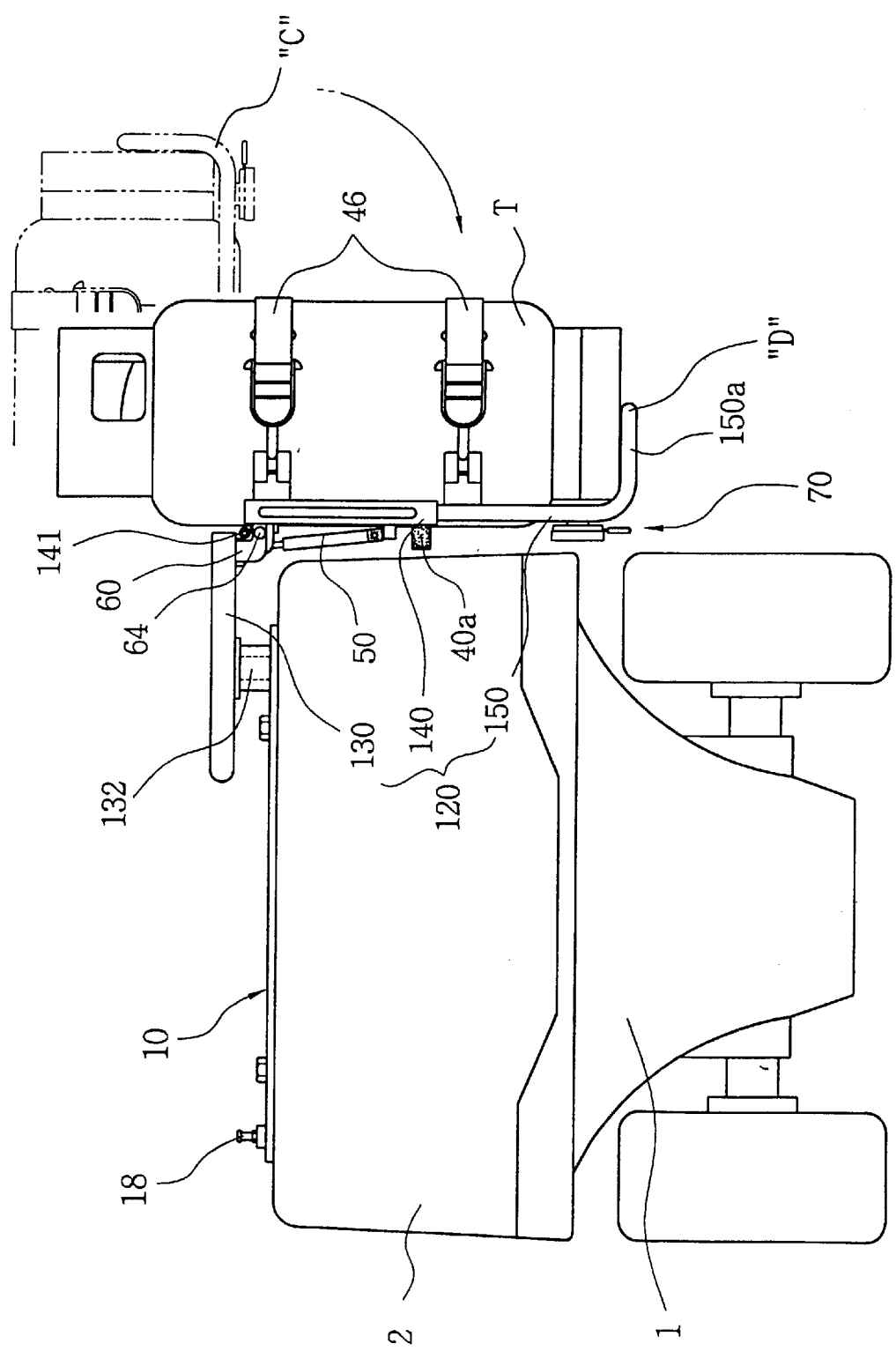
Figure 9C:
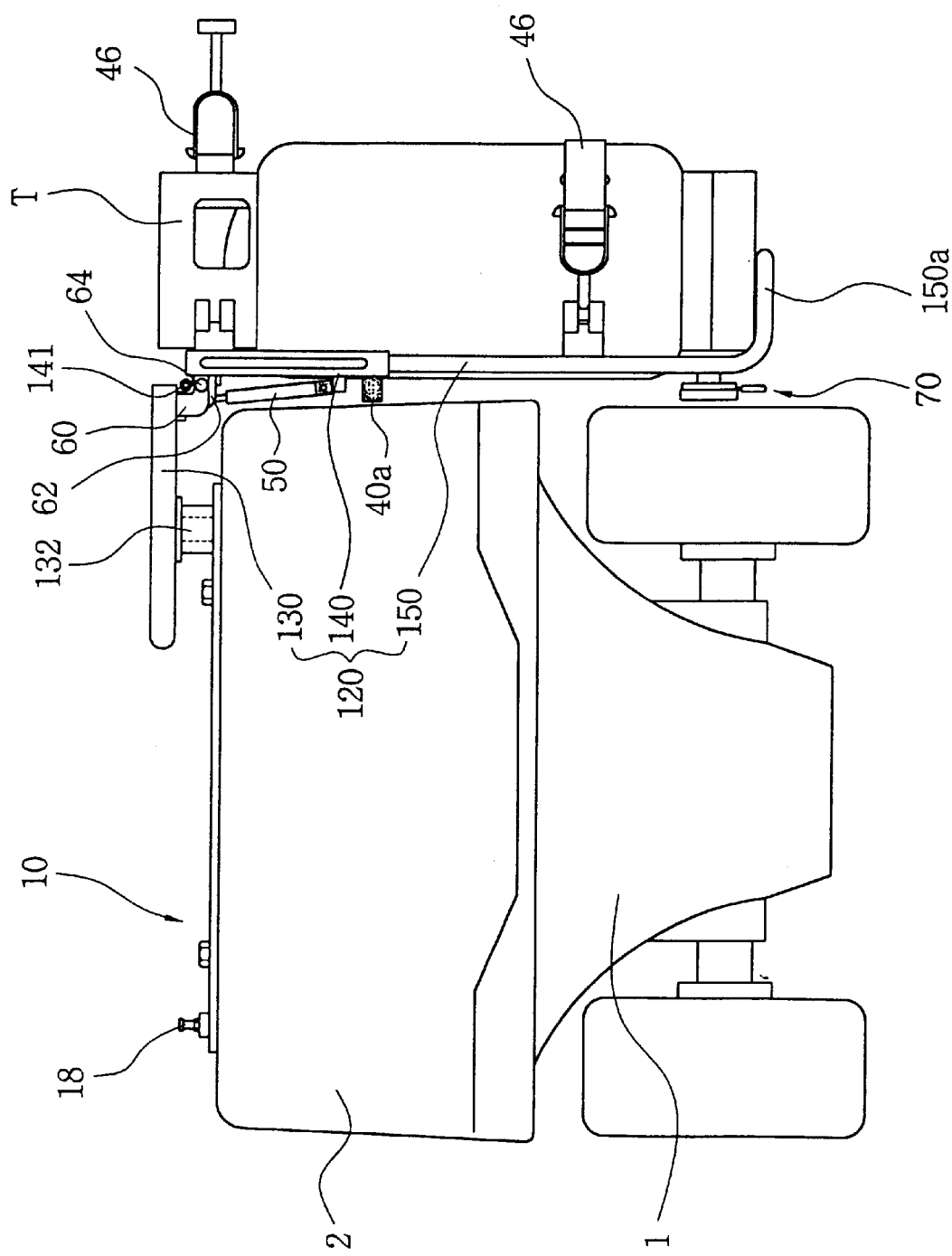

The third body 150 and the second body 140 is adapted to support the fuel tank T while making direct contact with the fuel tank T. The third body 150 has a supporting portion 150a that can support the lower surface of the fuel tank T and is assembled with the second body 140 in such a manner that the third body 150 can linearly move in the longitudinal direction of the second body 140. The third body 150 includes two rods 152 fitted in the tubular members 142 of the second body 140 in such a manner that the rods 152 can linearly move inwards or outwards of the tubular members 142, so that the third body 150 can be extended out from or inserted into the ends of the second body 140 in the longitudinal direction. Since the rods 152 are fitted in the tubular members 142 of the second body 140 in such a manner that the rods 152 can linearly move inwards or outwards of the tubular members 142, the third body 150 can be extended out from or telescopically inserted into the ends of the second body 140. Therefore, the fuel tank T standing upright can be lowered to a location adjacent to the ground, as shown in FIG. 9C. For this reason, the rod 152 of the third body 150 must have a sufficient length to allow the third body 150 to be lowered from the second body 140 to a location adjacent to the ground.

In the fuel tank cradle device according to the present embodiment, unlike the previous embodiment, the cradle latch 70 of the locking means for locking the cradle 120 to the base plate 10 is provided at the third body 150, and the locking pin 18 is so arranged as to be aligned with the cradle latch 70. Further, the pair of clamp assemblies 46 replaceably fastening the fuel tank T are provided at the second body 140 and the third body 150, one for each body. This construction ensures that one clamp assembly 46 can fasten the fuel tank T to the third body 150 even when the fuel tank T is lowered adjacent to the ground through the extension of the third body 150 from the second body 140 as shown in FIG. 9C.

Referring again to FIG. 7, the fuel tank cradle device according to the present embodiment includes a damping means for controlling the speed of the linear movement of the third body 150 with respect to the second body 140. The damping means includes, as shown in FIGS. 10A and 10B, cylinders 145 respectively formed at the tubular members 142 of the second body 140, rods 152 of the third body 150 which are movably disposed in the cylinders 145, pistons 154 formed at ends of the rods 152 and dividing an interior of each of the cylinders 145 to first and second chambers 146 and 147, connector tubes 148 connecting the first and the second chambers 146 and 147 of each of the cylinders 145 with each other, and oil 149 filled in the first and the second chambers 146 and 147.

According to this construction, when the third body 150 linearly moves with respect to the second body 140, the rods 152 of the third body 150 also perform linear movement along the cylinders 145 of the second body 140. At this time, the oil 149 filled in the cylinders 145 prevents the rods 152 having the pistons 154 from moving rapidly, but allows the rods 152 to slowly move along the cylinders 145. Meanwhile, as the rods 152 move along the cylinders 145, the volume of the second chamber 147 located in front of the movement is gradually reduced while the volume of the first chamber 146 located behind the movement gradually increases, as shown in FIG. 10B. In this case, the oil 149 in the second chamber 147 is fed through the connector tube 148 to the first chamber 146 of increasing capacity, so that the rod 152 can go on moving in its proceeding direction.

In other words, the moving speed of the third body 150 with respect to the second body 140 is controlled by the damping means having the construction described above. Therefore, the third body 150, which supports the heavy fuel tank T standing upright as shown in FIG. 9B, is prevented from rapidly extending out from the second body 140.

Figure 10A:
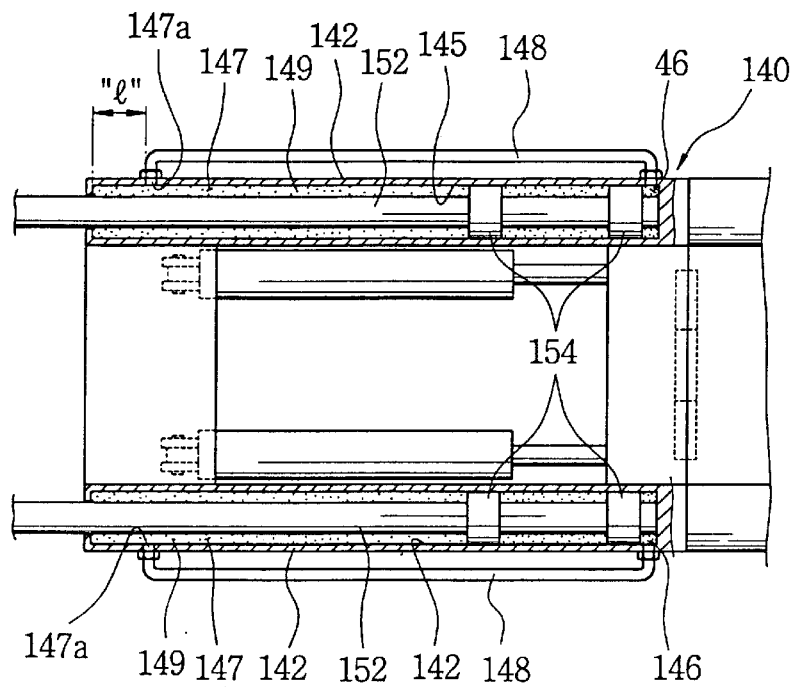
FIGS. 10A and 10B are sectional views taken along line II—II in FIG. 8, showing the construction of a damping means for controlling the moving speed of a third body with respect to the second body.
Figure 10B:
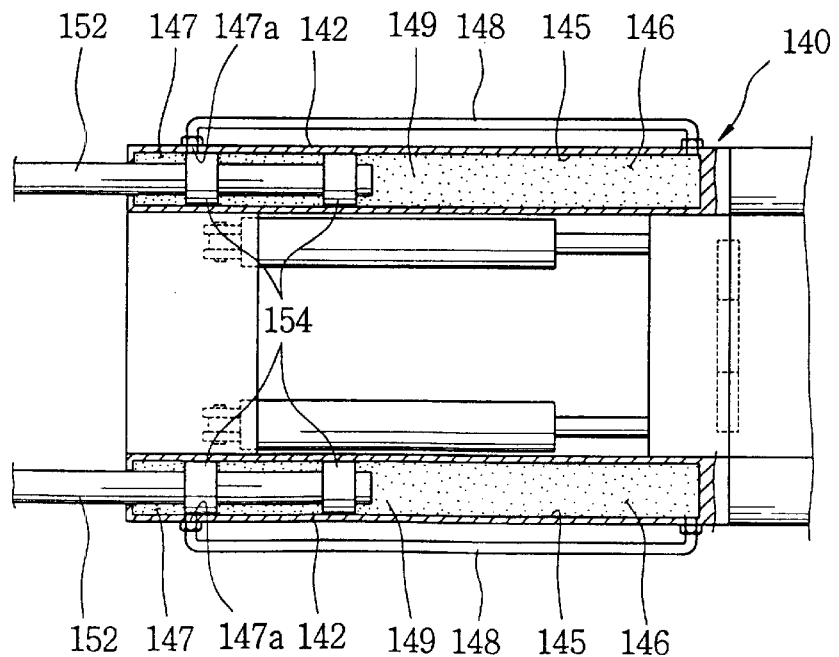

In the fuel tank cradle device according to the present invention, an oil port 147a of the second chamber 147 is formed at a location spaced apart distance 1 from one end of the second chamber 147 as shown in FIG. 10A, so as to prevent the piston 154 of the rod 152 from colliding with a portion of the side wall of the cylinder 145 when the third body 150 is extended out from the second body 140. Further, in the fuel tank cradle device according to the present invention, two pistons 154 are formed at each of the rods 152 in a spaced-apart relationship with each other so as to form as many overlapping sections between the cylinder 145 and the rod 152 as possible, thereby improving the structural integrity between the second body 140 and the third body 150 when the third body 150 is extended from the second body 140.

In the fuel tank cradle device of the construction described above, the third body 150 capable of being extended away from the second body 140 is further provided, so that the loaded fuel tank T can be lowered to as near the ground as possible as shown in FIG. 9C. Therefore, the fuel tank cradle device according to the present embodiment remarkably reduces the difficulty and danger in loading or unloading the heavyweight fuel tank T.

Figure 11:
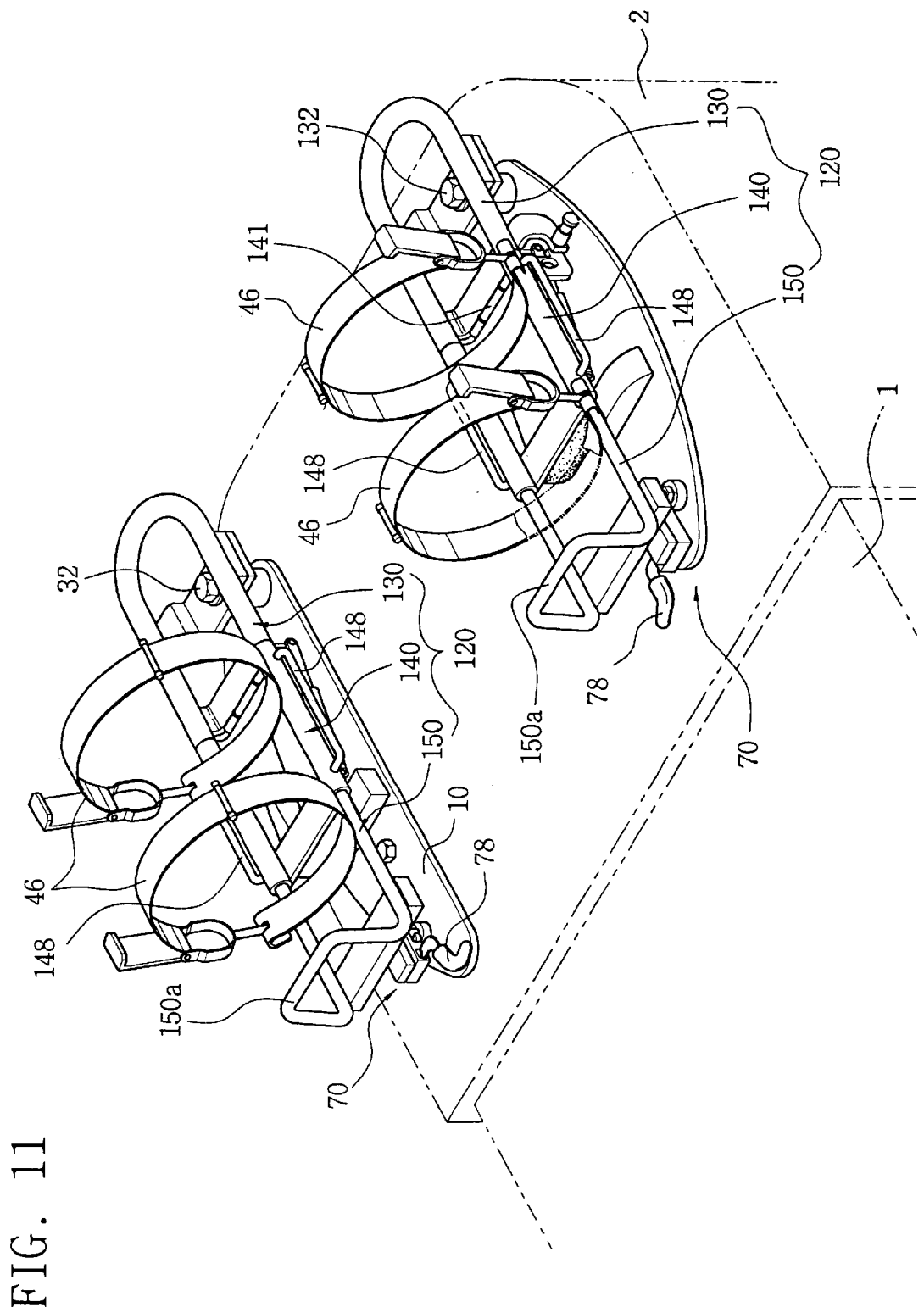
FIGS. 11 and 12 are perspective and plan views of a fuel tank cradle device for forklift trucks according to a further embodiment of the present invention.
Figure 12:
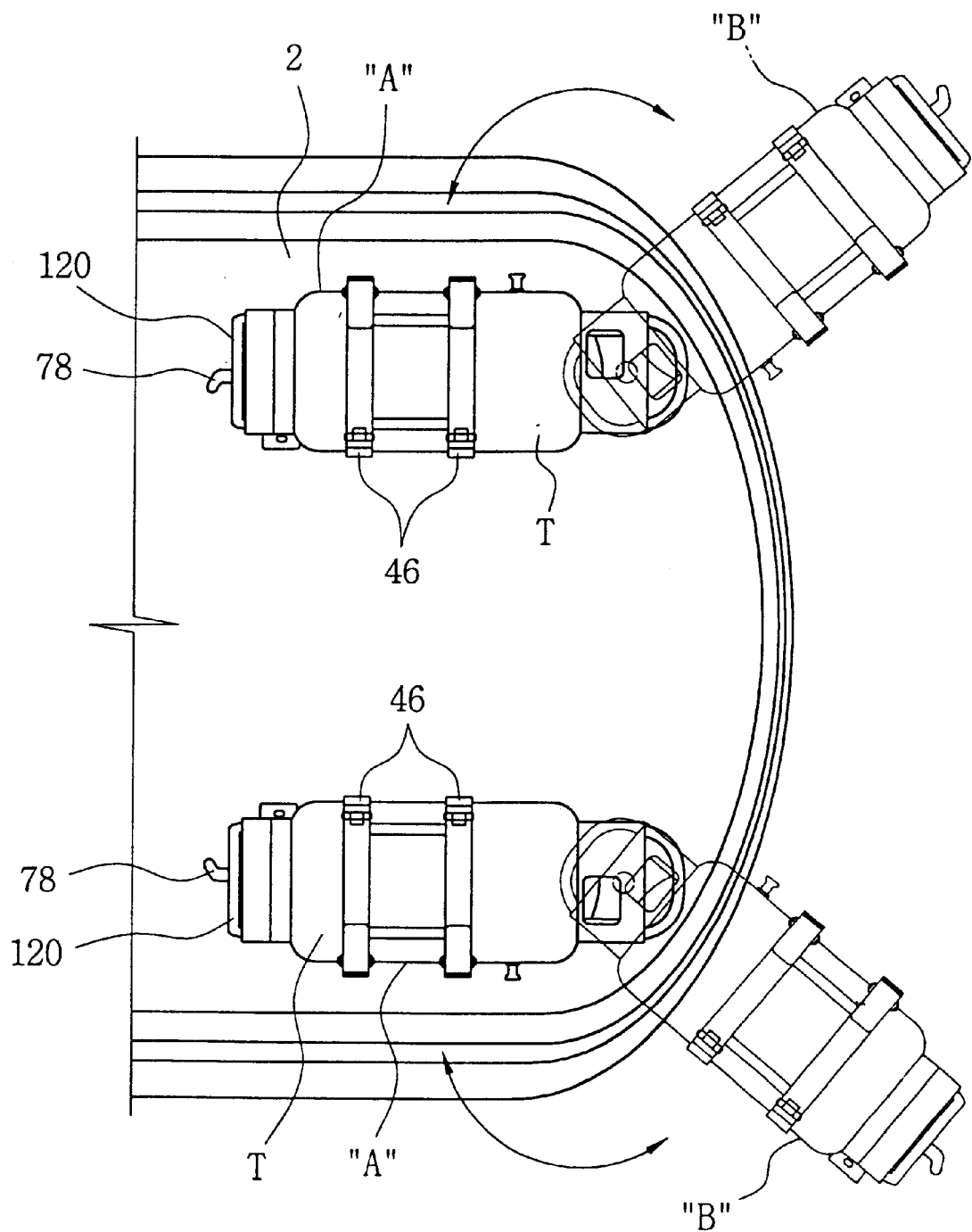

FIGS. 11 and 12 show a dual-type fuel tank cradle device according to a further embodiment of the present invention. The dual-type fuel tank cradle device includes two fuel tank cradle devices (hereinafter, referred to a first and second fuel tank cradle devices), which have the same construction and are disposed on opposite lateral side portions of the upper surface of the counterweight 2. In the dual-type fuel tank cradle device, the first and second fuel tank cradle devices enable a spare fuel tank T to be additionally loaded on a forklift truck, thereby assuring continuous fuel supply even when the fuel in one fuel tank is exhausted. It is preferred that the cradles 20 in the first and second fuel tank cradle devices can be rotated backward of the counterweight 2, so that the fuel tanks T can be easily replaced even in a narrow road or space. Instead of the first and second fuel tank cradle devices shown in FIG. 11, each of which has the cradle 120 including the first body 130, the second body 140, and the third body 150, it may be possible to sue first and second fuel tank cradle devices, each of which has a cradle 20 including a first body 30 and a second body 40, similarly to the fuel tank cradle device according to the embodiment shown in FIG. 1.

In the fuel tank cradle device according to the present invention as described above, a fuel tank can be replaced with minimal force in an easy and convenient manner, since the fuel tank can be located at an optimal position for the replacement of the fuel tank by way of rotating a cradle outward of the counterweight and then folding the cradle downwardly. The cradle capable of being extended further in the longitudinal direction enables the fuel tank to be lowered to as near the ground as possible, thereby largely reducing the danger which would otherwise be encountered in lifting the heavy fuel tank. Further, in the case of the dual-type fuel tank cradle device including two fuel tank, cradle devices, a spare fuel tank, which can be additionally loaded on a forklift truck, enables continuous fuel supply to the forklift truck even when the fuel in one fuel tank is exhausted.

Although certain preferred embodiments of the present invention have been described for illustrative purposes, those skilled in the art will appreciate that various modifications, additions and substitutions are possible without departing from the scope and spirit of the invention as disclosed in the accompanying claims.

What is claimed is:

1. A fuel tank cradle device for forklift trucks, comprising:
    a counterweight;
    a cradle including a first body and a second body, the first body pivotally mounted to the counterweight for rotation between a home position above the counterweight and a rotated position outside of the counterweight, the second body capable of replaceably supporting a fuel tank and foldably connected to the first body so that the second body can be moved between an unfolded position and a downwardly folded position; and
    means for locking the cradle to the counterweight while the first body of the cradle is at the home position.

2. The fuel tank cradle device for forklift trucks as recited in claim 1, wherein the cradle further includes a second body damping means for controlling the moving speed of the second body with respect to the first body, the second body damping means including a damper having a first end hingedly fixed to the first body and a second end hingedly secured to the second body, the damper adapted to elastically urging the second body toward the unfolded position.

3. The fuel tank cradle device for forklift trucks as recited in claim 1, wherein the cradle further includes a retaining means for keeping the second body at the unfolded position or the downwardly folded position, the retaining means comprising a first retainer bracket fixed to the first body, a second retainer bracket fixed to the second body in alignment with the first retainer bracket, a retainer pin movable assembled with the first retainer bracket, first and second retainer portions formed at the second retainer bracket in a manner that the retainer pin can be aligned with the first and the second retainer portions when the second body is located at one of the unfolded position and the downwardly folded position, and a retainer spring for normally biasing the retainer pin into engagement with the first and second retainer portions.

4. The fuel tank cradle device for forklift trucks as recited in claim 1, wherein the cradle further a third body capable of replaceably supporting a fuel tank and movably assembled with the second body so that the third body can be extended out from the second body.

5. The fuel tank cradle device for forklift trucks as recited in claim 4, wherein the cradle further includes a third body damping means for controlling the moving speed of the third body with respect to the second body, the third body damping means including at least one cylinder formed in a longitudinal direction of the second body, at least one rod extending from the third body and movably disposed in the cylinder, at least one piston formed at the rod and dividing an interior of the cylinder into first and second chambers, at least one connector tube connecting the first and the second chambers with each other, and oil filled in the first and the second chambers.

6. The fuel tank cradle device for forklift trucks as recited in claim 4, further comprising a pair of clamp assemblies for replaceably fastening the fuel tank to the second body and the third body.

7. The fuel tank cradle device for forklift trucks as recited in claim 1, further comprising cushioning element attached to a lower surface of the second body of the cradle.

8. The fuel tank cradle device for forklift trucks as recited in claim 1, further comprising a base plate fixed on the counterweight for rotatably supporting the cradle.

9. The fuel tank cradle device for forklift trucks as recited in claim 1, wherein the locking means comprises a cradle latch provided on the cradle and a locking pin formed at the base plate so that the licking pin can be locked into the cradle latch while the first body of the cradle is at the home position.

10. A fuel tank cradle device for forklift trucks, comprising:
    a counterweight;
    first and second cradle means provided at opposite lateral portions of an upper surface of the counterweight, wherein each of the first and second cradle means comprises a cradle including a first body and a second body, the first body pivotally mounted to the counterweight for rotation between a home position above the counterweight and a rotated position outside of the counterweight, the second body capable of replaceably supporting a fuel tank and foldably connected to the first body so that the second body can be moved between an unfolded position and a downwardly folded position; and
    means for locking the cradle of the first and second cradle means to the counterweight while the first body of the cradle is at the home position.

11. The fuel tank cradle device for forklift trucks as recited in claim 10, wherein the cradle of the first and second cradle means further comprises a second body damping means for controlling the moving speed of the second body with respect to the first body, the second body damping means including a damper having a first end hingedly fixed to the first body and a second end hingedly secured to the second body, the damper adapted to elastically urging the second body toward the unfolded position.

12. The fuel tank cradle device for forklift trucks as recited in claim 10, wherein the cradle of the first and second cradle means further comprises a retaining means for keeping the second body at one of the unfolded position and the downwardly folded position, the retaining means comprising a first retainer bracket fixed to the first body, a second retainer bracket fixed to the second body in alignment with the first retainer bracket, a retainer pin movable assembled with the first retainer bracket, first and second retainer portions formed at the second retainer bracket in a manner that the retainer pin can be aligned with the first and the second retainer portions when the second body is located at one of the unfolded position and the downwardly folded position, and a retainer spring for normally biasing the retainer pin into engagement with the first and second retainer portions.

13. The fuel tank cradle device for forklift trucks as recited in claim 10, wherein the cradle of the first and second cradle means further comprises a third body capable of replaceably supporting a fuel tank and movably assembled with the second body so that the third body can be extended out from the second body.

14. The fuel tank cradle device for forklift trucks as recited in claim 13, wherein the cradle of the first and second cradle means further comprises a third body damping means for controlling the moving speed of the third body with respect to the second body, the third body damping means comprising at least one cylinder formed in a longitudinal direction of the second body, at least one rod extending from the third body and movable disposed in the cylinder, at least one piston formed at the rod and dividing an interior of the cylinder into first and second chambers, at least one connector tube connecting the first and the second chambers with each other, and oil filled in the first and the second chambers.

* * * * *